United States Patent [19]

Tamir et al.

[11] Patent Number: 5,568,538
[45] Date of Patent: Oct. 22, 1996

[54] VOICE MESSAGE RECORDER FOR USE WITH TELEPHONES

[76] Inventors: Giora Tamir, 36 King Arthur Ct., New City, N.Y. 10956; Baruch Tamir, 23 Arcadian Dr., Wesley Hills, N.Y. 10977; Samuel Geffen, 5 Chestnut Grove Ct., New City, N.Y. 10956

[21] Appl. No.: 516,802

[22] Filed: Aug. 18, 1995

[51] Int. Cl.$^6$ ............... H04B 1/38; H04M 1/21; H04M 11/00
[52] U.S. Cl. .............. 379/58; 379/88; 379/447; 379/449; 455/90
[58] Field of Search ............... 379/78, 85, 86, 379/442, 443, 444, 441, 82, 68, 75, 61, 450, 433, 455, 430, 67, 88, 89, 451, 437, 447, 449; 455/89, 90, 128

[56] References Cited

U.S. PATENT DOCUMENTS

| | | | |
|---|---|---|---|
| 3,751,601 | 8/1973 | Wally | 369/8 |
| 4,027,249 | 5/1977 | Calman | 455/88 |
| 4,340,784 | 7/1982 | McQueen et al. | 379/73 |
| 4,367,374 | 1/1983 | Serrano | 379/442 |
| 4,415,776 | 11/1983 | Tang et al. | 379/84 X |
| 4,446,335 | 5/1984 | Lee et al. | 379/85 |
| 4,677,657 | 6/1987 | Nagata et al. | 379/63 |
| 4,712,250 | 12/1987 | Michels et al. | 455/20 |
| 4,715,063 | 12/1987 | Haddad et al. | 379/390 |
| 4,720,846 | 1/1988 | Hattori | 379/79 |
| 4,734,930 | 3/1988 | Quiros et al. | 379/88 |
| 4,858,798 | 8/1989 | Siddoway et al. | 455/90 X |
| 4,862,509 | 8/1989 | Townsend | 381/163 |
| 4,905,270 | 2/1990 | Ono | 379/58 |
| 5,048,074 | 9/1991 | Dugdale | 379/58 |
| 5,059,141 | 10/1991 | Scott | 439/638 |
| 5,081,668 | 1/1992 | Ito | 379/58 |
| 5,111,500 | 5/1992 | Afshar et al. | 379/67 |
| 5,123,044 | 6/1992 | Tate | 379/451 |
| 5,128,982 | 7/1992 | Dugdale et al. | 379/89 |
| 5,185,789 | 2/1993 | Hanon et al. | 379/395 |
| 5,243,640 | 9/1993 | Hadley et al. | 379/59 |
| 5,319,716 | 6/1994 | McGreevy | 381/79 |
| 5,335,273 | 8/1994 | Takagi et al. | 379/433 |
| 5,454,036 | 9/1995 | Gleeman et al. | 379/392 |

FOREIGN PATENT DOCUMENTS

| | | | |
|---|---|---|---|
| 0176258 | 8/1987 | Japan | 379/442 |

OTHER PUBLICATIONS

"Executive idea keeper", The Sharper Image catalog, Nov. 1988, p. 40.

*Primary Examiner*—Thomas W. Brown
*Attorney, Agent, or Firm*—Kirschstein et al.

[57] ABSTRACT

A telephone apparatus includes, in combination, a handset unit and a voice message recording unit that is supported on the handset unit so as to be disposed at the general vicinity of the user's mouth when the handset unit is in the use position thereof. The recording unit may be both physically and electrically interposed between the handset unit and a telephone cord leading to a base unit of the telephone apparatus, in which case the loudspeaker of the handset unit can be used by the recording unit as well, or be mounted on or physically incorporated within a flap of the handset unit, or be partially received in an externally disposed pocket of a case for the handset unit. In these instances, the recording unit is self-contained in that it has its own device for processing electrical signals issued by a recording device of the recording unit and representative of prerecorded sounds into audible sounds, be it a built-in loudspeaker or an FM transmitter that broadcasts signals to be picked up and converted into the audible sounds by a nearby radio receiver.

12 Claims, 3 Drawing Sheets

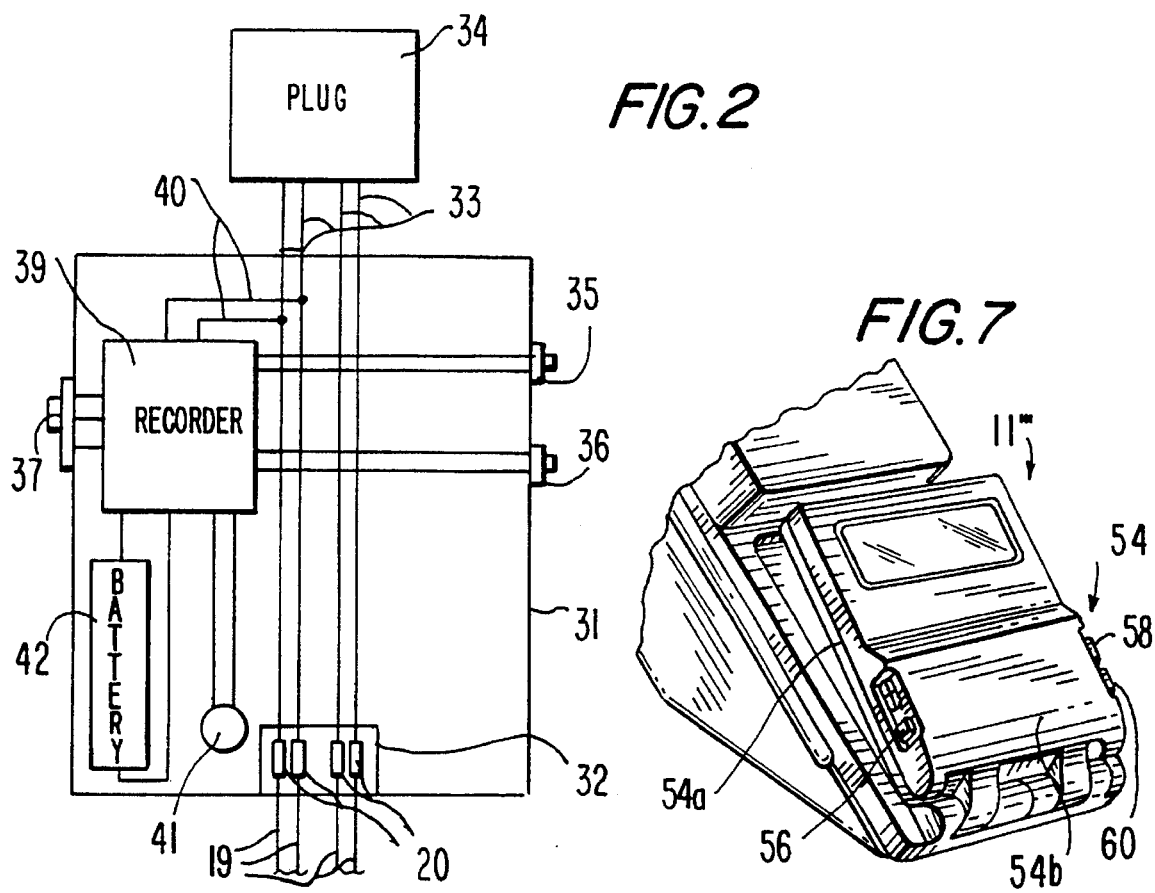
FIG. 2
FIG. 7
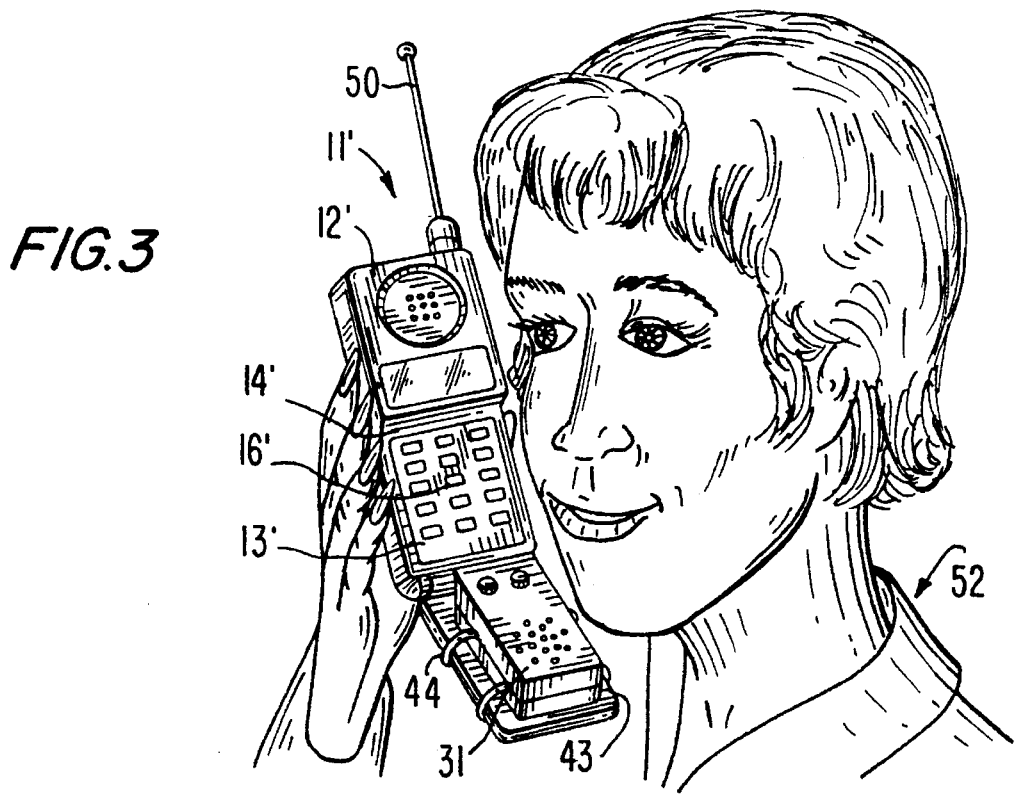
FIG. 3

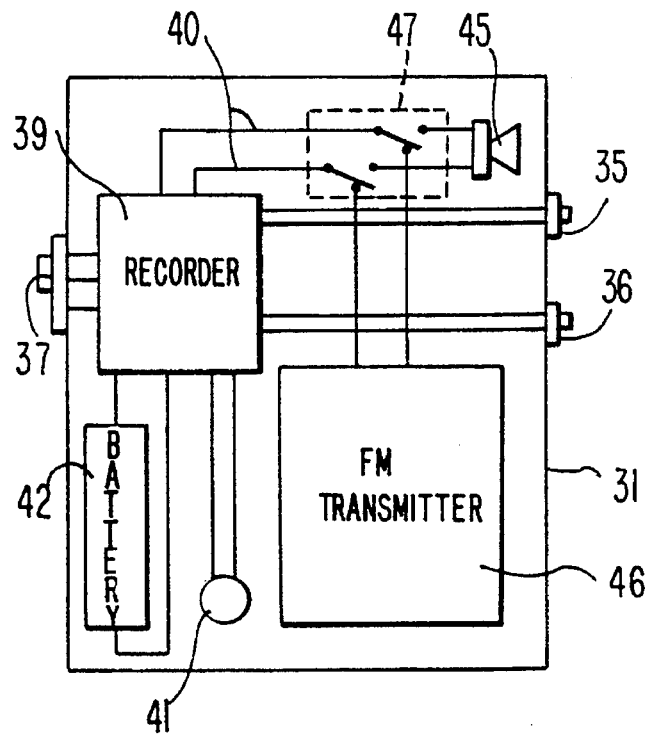
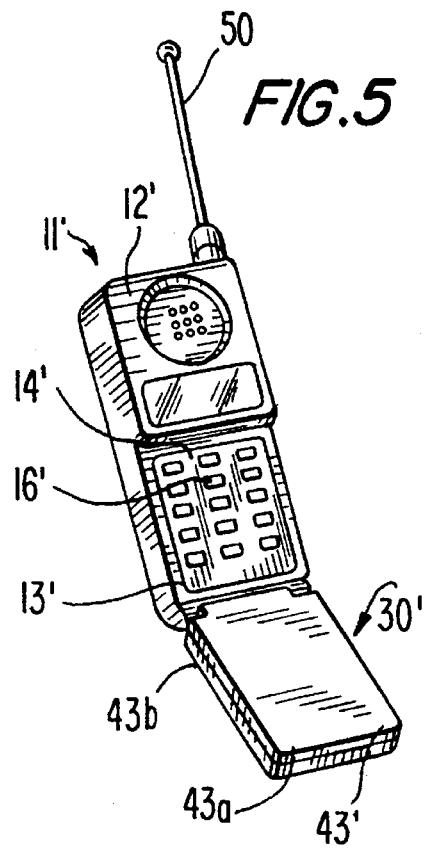
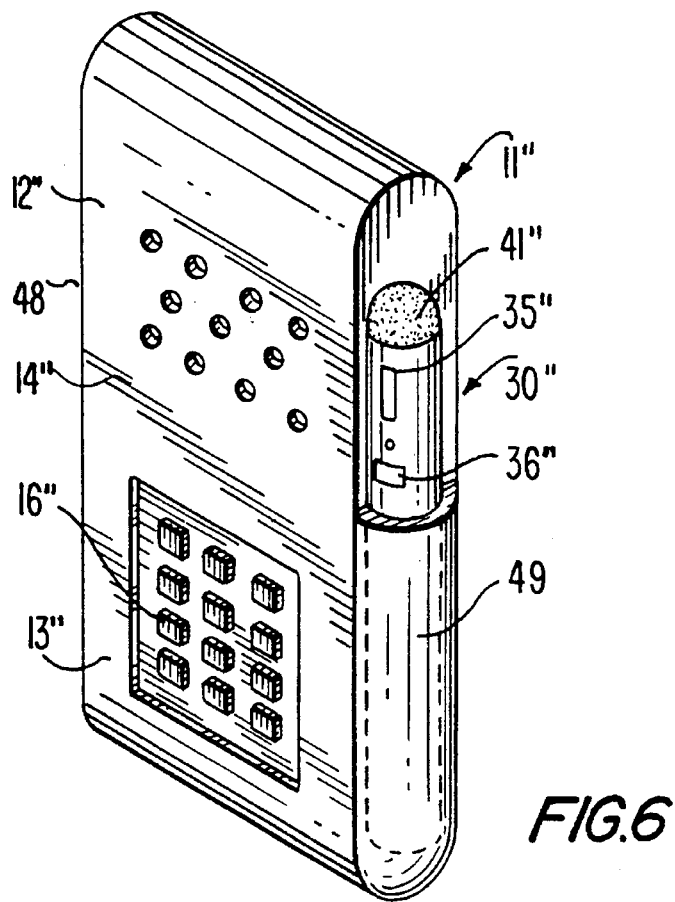

5,568,538

VOICE MESSAGE RECORDER FOR USE WITH TELEPHONES

BACKGROUND OF THE INVENTION

FIELD OF THE INVENTION

The present invention relates to telephone apparatus in general, and more particularly to message recording equipment to be used in conjunction therewith.

DESCRIPTION OF THE RELATED ART

There are already known various constructions of telephone apparatus, among them, besides the traditional wall-mounted, desk or nightstand units, the so-called cordless telephones that include a base unit and a handset unit that communicate with one another by limited range broadcasting, and the so-called cellular telephones that communicate either with a remote central base unit or directly with an overhead satellite.

Regardless of the construction of the telephone apparatus, though, there is often a pronounced need to create a memorandum of, for instance, a name and telephone number of a caller, a time and place of an event to attend, or the like, either while a particular telephone conversation is in progress, or immediately after its conclusion or, generally speaking, at any time. Traditionally, this was accomplished by having a notepad and a writing utensil handy close to the telephone. However, there is a tendency for one or the other, or both, of such items to disappear from its intended location just before a particularly important or crucial piece of information is to be jotted down, so that the telephone user has to interrupt the conversation and try to locate the missing item or a replacement for it.

A similar problem also exists when a more recent development in the information recording field, a so-called voice message recorder, is to be used instead of the paper-and-pencil duo. More particularly, message recorders of this type, which are designed to record a number of relatively short messages on digital data storage chips, are relatively small units that are easily misplaced or covered up by other items that may be present at the vicinity of the telephone apparatus, so that the telephone users again have to go to look for them, or fumble through papers and the like trying to locate them, sometimes in a futile effort, before being able to use them. Moreover, as a result of the miniature size and the resulting easy portability of such voice message recording units, it is highly likely that they will be transported to a location distant from its originally intended one, like to a different telephone apparatus or practically anywhere within the apartment or home, leaving the next potential user of the recording unit at a loss where to even start looking for the recording unit.

OBJECTS OF THE INVENTION

Accordingly, it is a general object of the present invention to avoid the disadvantages of the prior art.

More particularly, it is an object of the present invention to provide a voice recording unit that does not possess the drawbacks of the known recording units of this type.

Still another object of the present invention is to devise a voice recording unit of the type here under consideration that is always readily available at the location of a telephone apparatus for use if desired.

It is yet another object of the present invention to design the above recording unit in such a manner as to be compatible with existing telephone apparatus of any type.

A concomitant object of the present invention is so to construct the voice message recording unit of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in a telephone apparatus that includes a handset unit having a mouthpiece portion to be located close to the mouth, and an earpiece portion to be situated at the ear, of a user in a use position of the handset unit, and a handgrip portion interconnecting the mouthpiece and earpiece portions, in combination with a voice message recording unit including an electric power source, a voice message recording device, a microphone operative for converting sounds into electrical signals and electrically connected to the voice message recording device for supplying the electrical signals thereto, means for controlling the operation of the voice message recording device in a recording and playback mode, and means for supporting the voice message recording unit on the handset unit so as to be disposed at the general vicinity of the user's mouth when the handset unit is in its use position. A particular advantage of the present invention as described so far is that, because of the presence of the aforementioned supporting means, the likelihood that the voice message recording unit could be misplaced is significantly reduced if not eliminated altogether.

In one advantageous embodiment of the present invention, the telephone apparatus further includes a base unit and a telephone cord connected to the base unit and having a modular telephone plug at a free end thereof, and the handset unit has a modular telephone receptacle therein. Then, it is advantageous for the voice message recording unit to further include a casing accommodating all other of its components, and means for establishing electrical connections between the modular telephone plug of the telephone cord and the modular telephone receptacle of the handset unit. Such establishing means advantageously includes an auxiliary modular telephone receptacle in the casing for receiving the plug of the cord, an auxiliary modular telephone plug to be inserted into the receptacle of the handset unit, a short length of telephone cord connected to the auxiliary plug and secured to the casing, and electrically conductive means passing through the interior of the casing and electrically connecting the auxiliary receptacle with the short length of telephone cord.

In this context, it is especially advantageous when the handset unit includes a loudspeaker received within its earpiece portion, when the electrically conductive means of the voice message recording unit includes at least one portion forming a part of an electrically conductive path between the base unit and the loudspeaker of the handset unit, and when the voice message recording unit includes at least one output for electric signals representative of previously recorded voice messages, and means for electrically connecting the output to the aforementioned at least one portion of the electrically conductive means. In this manner, a separate loudspeaker for the voice message recording unit can be dispensed with in that the telephone handset unit loudspeaker is shared by the handset unit and the recording unit.

According to another advantageous aspect of the present invention, the handset unit includes a handset proper and a flap hingedly connected to the handset, in which case the supporting means supports the voice message recording unit on the flap. The voice message recording unit may then include its own casing that accommodates the other components of the voice message recording unit, in which event the supporting means advantageously includes connecting means connected to one and engaging the other of the casing and the flap. However, in an alternative, the flap may include one shell part hingedly connected to the handset and another shell part secured to the one shell part, the shell parts accommodating the voice message recording unit between themselves to serve as the supporting means.

It is further advantageous, in accordance with another feature of the present invention, if the voice message recording unit further includes means for processing electrical signals that are representative of voice messages previously recorded and appearing on at least one output of the voice message recording device to convert them into corresponding audible sounds. Such processing means may include a dedicated loudspeaker or an FM transmitter, or both, forming a part of the voice message recording unit and electrically connected with the at least one output of the voice message recording device. The transmitter, if present, is operative for broadcasting FM signals corresponding to the electrical signals for reception at and conversion thereof into the audible signals by a nearby multipurpose radio receiver. If both the loudspeaker and the FM transmitter are provided, then it is advantageous to provide a selector switch movable between two positions in which it connects the at least one output of the voice message recording device with one of the loudspeaker and the transmitter to the exclusion of the other.

In accordance with another facet of the present invention, the voice message recording unit includes a casing that accommodates its other components, and there is further provided a case for receiving the handset unit. Under these circumstances, the supporting means advantageously includes means for forming a pocket on the exterior of the case for partially receiving the voice message recording unit.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a simplified block diagram showing certain components of the voice recording unit of FIG. 1 and electrical interconnections between them;

FIG. 3 is a perspective view of a modified embodiment of the combination of the present invention as embodied in conjunction with one cordless telephone apparatus construction;

FIG. 4 is a block diagram similar to that of FIG. 2 but showing a modification of the recording unit;

FIG. 5 is a perspective view akin to that of FIG. 3 but showing the present invention as used in conjunction with a different construction of the cordless telephone apparatus;

FIG. 6 is a perspective view of a further modification of the cordless telephone apparatus and of the recording unit associated therewith; and FIG. 7 is a broken-away, perspective view of a modification of the telephone apparatus of FIG. 5, equipped with the present invention.

DETAILED DESCRIPTION OF THE PREFERRED EMBODIMENTS

Figure 1:
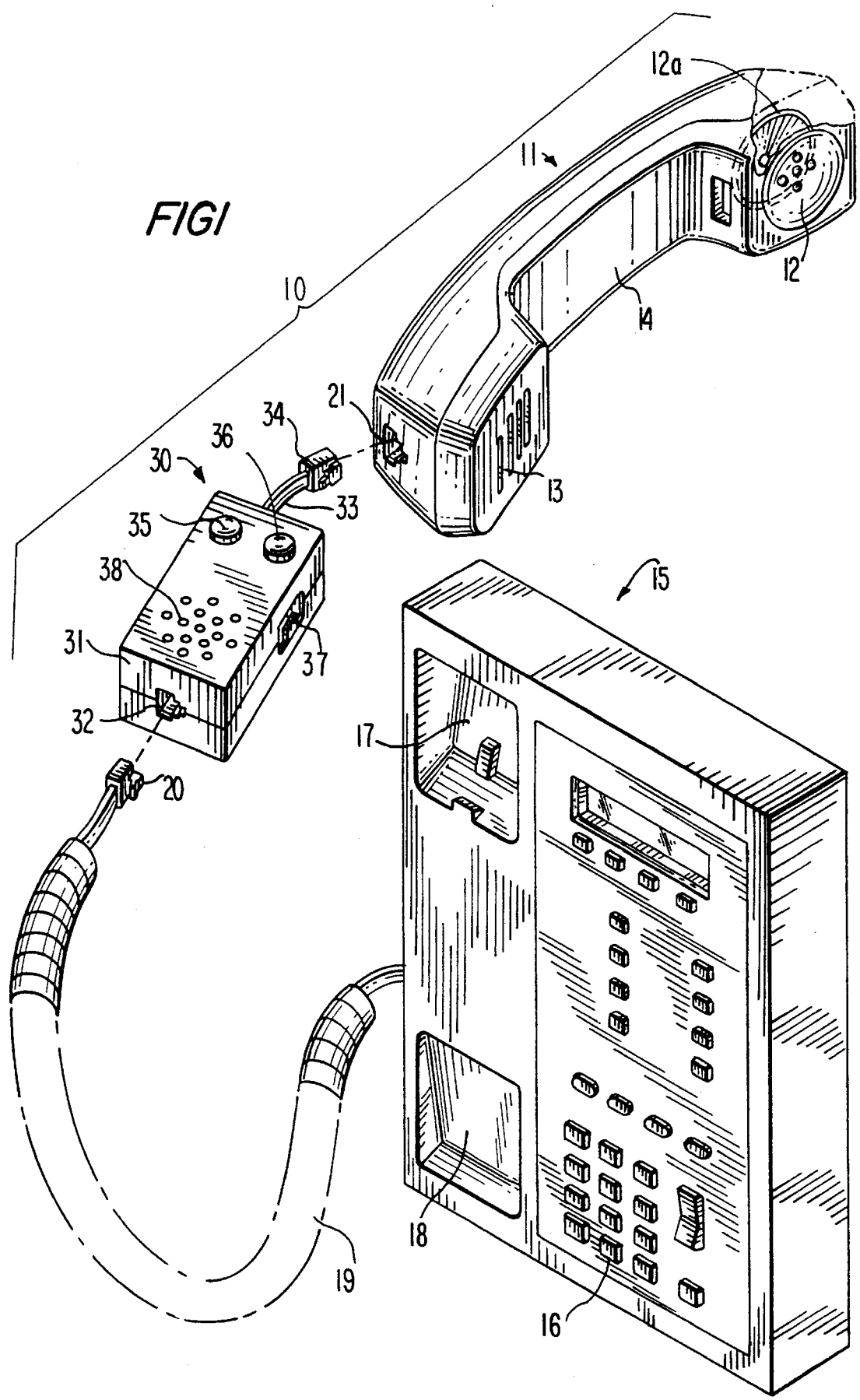
FIG. 1 is a perspective exploded view of an embodiment of a telephone apparatus and voice recording unit combination of the present invention.

Referring now to the drawing in detail, and first to FIG. 1 thereof, it may be seen that the reference numeral 10 has been used therein to identify a telephone apparatus of the type in conjunction with which the present invention is contemplated to be used. The telephone apparatus 10 itself may be of almost any known construction and configuration, so long as it possesses those features, which will become readily apparent as the present description proceeds, that make it compatible with the concepts embodied in the present invention. In the exemplary embodiment shown, the telephone apparatus 10 is constructed and used as a wall-mounted unit, as it frequently is in household kitchens and similar relatively busy areas where it is typically desired for the telephone apparatus 10 to be out of the way of other activities taking place there, yet to be close at hand for use when needed. However, it will be appreciated that the wall-mounted feature is not critical to the present invention.

The illustrated telephone apparatus 10 includes, as one of its main components, a handset unit 11. The handset unit 11 is shown to include an earpiece portion 12 and a mouthpiece portion 13 that are connected with one another by a handgrip portion 14. As is customary, the earpiece portion 12 is provided in its interior with a sound generating device including an amplifier and a loudspeaker 12a, while a microphone is accommodated inside the mouthpiece portion 13. These electronic devices, as well as others that are contained either within the handset unit 11 or in or on a base unit 15 that constitutes another main component of the telephone apparatus 10, are of conventional constructions so that they need not be illustrated or discussed here in detail, nor will they be. Suffice it to say that such devices are incorporated in an electronic circuitry that converts sounds picked up by the microphone into electrical signals to be sent from the base unit 15 into a telephone line, and also converts incoming electrical signals from the telephone line into sounds issued by the loudspeaker.

As shown, the base unit 15 is provided with a control panel 16 that again is of a known construction so that it need not be explained here in any detail. The illustrated control panel 16 includes a keypad that includes the customary numerical and other keys to be used in dialing remote subscribers and/or sending data to remote computers or the like once the telephone connection with them is established. Here again, the provision of the keypad on the base unit 15 is not critical to the invention; instead, it could be mounted on the handset unit 11 and particularly on its handgrip portion 14. The base or wall unit 15 is shown to be provided with two recesses 17 and 18 that partially receive the earpiece portion 12 and the mouthpiece portion 13 of the handset 11 when the latter is "on hook".

What is also shown in FIG. 1 of the drawing is that a telephone cord 19 extends from the base unit 15. This telephone cord 19 is provided at least at its end that is remote from the base unit 15 with a modular plug 20. Traditionally, this telephone plug 20 was received and releasably locked in place in a substantially complementarily configured socket 21 that is provided in the mouthpiece portion 13 of the handset unit 11. That is no longer true when the present invention is being used.

Rather, in accordance with the present invention, there is provided a miniature voice recording unit 30 that is interposed between the telephone plug 20 and the telephone socket 21. As shown, the unit 30 includes a casing 31 that is provided at its one end face with an auxiliary modular telephone socket or receptacle 32. According to the present invention, the socket 32 is to receive and establish the requisite electrical contacts with the modular plug 20 of the telephone cord 19. Also, a detangler could be interposed between the socket 32 and the plug 20 so that the telephone cord 19 will got twist and become tangled with itself.

Moreover, a telephone cord 33 of a relatively short length extends out of the casing 31 at the opposite end face thereof and carries at its free end that is remote from the casing 31 an auxiliary telephone plug 34. In further accord with the invention, it is this auxiliary telephone plug 34 that is plugged or inserted into the modular telephone socket 21 of the handset 11 and establishes the necessary electrical contacts therewith.

The casing 31 further carries two switches or buttons 35 and 36 that control recording and playback, respectively but not necessarily in that order, and another switch 37 that renders it possible to switch between various information carrying channels, in a manner that is well known. The casing 31 is also provided with perforations 38 that are distributed in an orderly fashion and serve as sound conduits to a microphone that is accommodated inside the casing 31 and hence is not shown here.

The switches 35 to 37 and the various control circuits in which they are incorporated, as well as the operation of such circuits, are so well known that they need not be discussed here to any greater extent than will be done presently in conjunction with FIG. 2 of the drawing. As shown there, a recorder device 39, which is of any known construction, preferably including a digital data storage integrated circuit chip, is accommodated in the interior of the casing 31 and is connected by respective electrical leads with the respective switches 35, 36 and 37 to enable the latter to control its operation. The recorder device 39 further includes a pair of output terminals that are respectively connected by wires or other electrical conductors 40 to two of the four leads 33 that are shown to extend from the receptacle 32 first through the interior of the casing 31 and then beyond it to the plug 34.

The recorder device 39 also has a pair of input terminals that are electrically connected with an only diagrammatically indicated microphone 41. A battery 42 that is also mounted in the interior of the casing 31 supplies electric current to the recorder device 39 and via the same to the microphone 41 and to the electrical leads 40. It should be clear by now, considering the fact that the microphone 41 is accommodated in the casing 31 and a corresponding loudspeaker is conspicuously absent therefrom, that the two leads 33 to which the electrical conductors 40 and hence the output terminals of the recorder unit 39 are connected are those that lead to the aforementioned loudspeaker accommodated in the earpiece portion 12 of the handset unit 11 of the telephone apparatus 10, and that this loudspeaker consequently doubles up as a loudspeaker for the voice message recording unit 30.

In operation, the telephone apparatus 10, when it is to be used merely to make telephone calls, can be operated in the usual manner, that is as if the recording unit 30 were not interposed between it and the electrical cord 19. This is so because unimpeded electrically conductive paths exist through the voice message recording unit 30 from the plug 20 of the cord 19, which is indicated in FIG. 2 by respective small rectangles representative of the respective electrical contacts of the plug 20, through the receptacle 32 all the way to the plug 34. As a result, the voice message recording unit 30 is so to speak transparent to the telephone apparatus 10 under these circumstances.

Yet, if the user of the telephone apparatus 10 feels that he or she should record some message of his or her own to serve as a reminder at a later point of time, he or she can do it by simply depressing the appropriate one(s) of the buttons 35, 36 and 37 and talking into the microphone 41 through the perforations 38 of the casing 31. It will be appreciated that, inasmuch as the unit 31 is self-contained as far as the recording function is concerned, the recording can take place even during an ongoing telephone call, or at any other appropriate time, either immediately following a telephone conversation or independently thereof, depending on what triggered the perceived need for using the recording unit 30 for recording the message. On the other hand, since the telephone apparatus 10 and the recording unit 30 share the same loudspeaker (that of the telephone apparatus 10) in this particular implementation of the present invention, it is at least more practical to play back the previously recorded messages at a time when the telephone apparatus 10 is not being used for making any telephone calls.

Turning now to FIG. 3 of the drawing, it should be self-evident that it reveals an implementation of the present invention in conjunction with a so-called cordless or cellular telephone apparatus including at least a handset unit 11'. No distinction will be made now or later between such portable telephone apparatus types inasmuch as the principles of the present invention are the same or at least very similar in both cases. However, a single prime will be used now with each of the reference numerals of this unit 11', and a double prime later, to distinguish them from functionally equivalent parts of the telephone apparatus 10 shown in FIG. 1 of the drawing.

Here, the hand-held unit 11' also includes an earpiece portion 12' and a mouthpiece portion 13', but it is also provided on its handgrip portion 14' with a control panel 16' that is equipped with the aforementioned keypad or the like. Moreover, the hand-held or handset unit 11' is shown to be constructed as a so-called "flip"-type telephone unit in that it is equipped with a flap 43 that is hingedly connected with the handset unit 11' proper for pivoting into and out of a position in which it is juxtaposed with the control panel 16'.

The present invention utilizes the presence of this flap 43, which traditionally has no electrical or electronic components supported thereon or received therein, for supporting the voice message recording unit 31 of the present invention at a location that is close to the mouth of a user 52 when the flap 43 is in its illustrated flipped-open position. To hold the recording unit 31 in place on the flap 43, there are provided respective straps 44. These straps 44 can be constructed as resilient metal components rigidly connected with one and resiliently engaging the other of the unit 31 and the flap 43, for instance. However, they could also be constituted by any other clamping or fastening components, of which so-called Velcro™ fasteners are just one example. FIG. 3 also shows that the hand-held telephone unit 11' is equipped with an antenna 50, as is usual in this context.

For use with the detached, portable handset unit 11', the message recording device 30' is constructed as a self-contained unit, that is, it is equipped with its own means for re-converting the stored electrical signals representative of the recorded messages into sounds. This is so because the output lines 40 of the recorder 39 can no longer be conveniently connected to the loudspeaker of the handset 11'. In the simplest case, a separate loudspeaker 45 is accommodated in the interior of the casing 31, in which case the output leads 40 of the recorder 39 are directly connected thereto. At this juncture, it is to be mentioned that, while the recorder device 39 is shown to have respective pairs of inputs and outputs connected with the various components such as the switches 35 to 37, the microphone 41, the battery 42 etc., in practice it will be usually more convenient to provide a common ground for all of such components, and have just a single input or output on the recorder device 39 for each of them.

While FIG. 4 shows the provision of the separate or dedicated loudspeaker 45 in the casing 31, it shows something more as well, namely the presence of an FM transmitter 46 in the casing 31. The loudspeaker 45 and the transmitter 46 can be provided as mutually exclusive options each connected directly with the output leads 40 of the recorder 39. However, it is advantageous to equip the recording unit 30 with both of them, and to provide an additional switch 47 interposed between the output lines 40 and the loudspeaker 45, on the one hand, and the FM transmitter 46, on the other hand, thus enabling the user of the device 30 to select which one of them to use in any particular instance.

Obviously, when the loudspeaker 45 is in use, it will generate sounds during playback. However, given the miniature size of the unit 30 and of its components, such sounds may be too faint to be heard in a noisy environment, such as in a moving car. If, however, an FM radio or similar receiver is available at the location at which the playback is to take place, it can be used for generating more readily perceptible sounds, in that the switch 47 is flipped into its position in which it connects the output leads of the recorder 39 exclusively with the FM transmitter 46. The latter then transmits signals at an FM frequency that is not used by any local stations and at a power that is so low as not to have any noticeable impact beyond the immediate vicinity of the handset 11' and of the aforementioned FM receiver.

Thus, when the latter is tuned to the transmission frequency of the FM transmitter 46, it will amplify the signals broadcast by the transmitter 46 to a level at which the sounds can be heard with sufficient clarity over the background noise. For almost universal use, it is best to tune the transmitter 46 to a frequency that is reserved all over the country for local announcements (usually traffic reports broadcast to the general public), but is being actually used only in certain very limited areas. It goes without saying that the power of the transmitter 46 has to be so low as not to interfere with this operation, that is, not to be picked up by other radio receivers located at even a relatively small distance (that between two cars) from the intended receiver and tuned to the same frequency, and that the playback will be possible or effective only outside the areas in which the local announcements are being broadcast.

FIG. 5 of the drawing illustrates, in a somewhat simplified manner, how the aforementioned recording unit, which is indicated at 30' this time, can be incorporated into the flip-type telephone unit or handset 11'. In this instance, the flap 43' is shown to consist of two shell-shaped parts 43a and 43b that are joined together in any known manner. In certain "flip-phone" models, the flap 43' is constructed in that manner to begin with. In that case, the handset 11 can be easily retrofitted with the voice message recording unit 30' of the present invention by simply disconnecting the shell part 43b from the shell part 43a (the latter being usually the one that is hinged to the handset 11' proper) and either replacing it with a substitute one that has all of the aforementioned components of the voice message recording unit 30' already mounted thereon (as described below in connection with FIG. 7), or reconnecting it with the shell part 43a after the above components have been sandwiched between the shell parts 43a and 43b, typically in the form of a printed circuit board carrying such individual components as well as the electrical connections between them.

It goes without saying that one or the other of the shell parts 43a and 43b may have to be provided with perforations in order to present sound passageways into and/or out of the interior of the casing that is constituted by the assembled flap 43' in this particular instance. It is also to be understood that, even though this has been omitted from FIG. 5 in order not to unduly encumber the drawing, the flap or casing 43' carries one or more of the aforementioned switches or buttons 35 to 37 and 47 in a manner making them easily accessible from the exterior of the flap 43'. While such switches 35 to 37 and/or 47 could be located at one or the other of the major surfaces of the flap 43', it is currently preferred to arrange than at opposite lateral edge regions of the flap 43', that is those edge regions that extend from the hinges to the free end portion of the flap 43', and advantageously close to the latter.

A relatively recent development in the field of wireless telecommunications, or at least of cellular communications, is the so-called "flip-less" cellular or portable telephone handset unit like that indicated at 11" in FIG. 6. Of course, since the telephone handset unit 11" of this type is not equipped with a flippable flap, it was necessary to develop different means for supporting the recorder unit 30" on the handset unit 11" at the general vicinity of the mouth of the user of the telephone handset unit 11".

Such novel supporting means includes, on a carrying case 48 of leather, vinyl, fabric or other similar natural or synthetic material which may be provided in any event in order to protect the handset unit 11" from damage, shock and/or other undesirable environmental influences, a pouch-like pocket 49, preferably of a stretch, elastic material, for partially and snugly receiving the recording unit 30". As illustrated, the pocket 49 is situated at the side of the carrying case 48, extends from close to the bottom to about half-way up the height of the case 48, and opens in the upward direction as considered in the illustrated orientation that corresponds to that in which the telephone handset unit 11" is being usually used.

In this instance, the voice message recording unit 30" has a configuration resembling that of a pen or similar writing utensil, and is inserted into the open end of the pocket 49 from above. Thus, under normal circumstances, the gravity pull will act to keep the voice message recording unit 30" safely in the pocket 49. However, the voice message recording unit 30" is preferably received in the pocket 49 with a certain amount of frictional engagement so as to prevent it from inadvertently slipping out of the pocket 49 when the telephone handset unit 11" is held in any other than its use position, or when the handset unit 11" is being displaced, possibly with a jerky motion. It may be seen in FIG. 6 that a substantial part of the elongated voice message recording unit 30" projects out of the pocket 49, and that this projecting part carries at least the switches 35" and 36" and the microphone 41", thus making them accessible for manipulation in the first case, and for unimpeded sound propagation in the second case.

FIG. 7 depicts the lower end of a flip-type telephone unit or handset 11''' modified from that shown in FIG. 5, but still having a flap 54 constructed of two shell parts 54a and 54b. Shell part 54a is hinged to the handset proper, while shell part 54b is removably connected to shell part 54a.

The removable shell part 54b is advantageously provided with all the aforementioned components of the voice message recording unit mounted thereon. Hence, a user can remove the original factory-installed shell part, and substitute the shell part 54b equipped with the recording unit of this invention. Of course, a manufacturer could also supply the telephone unit with the recording unit already built in.

FIG. 7 also shows a slide switch 56 and push buttons 58 and 60 located at the lateral edges of the flap 54 to enable the user to have ready access thereto to control the recording unit.

It will be understood that each of the elements described above, or two or more together, may also find a useful application in other types of constructions differing from the type described above.

While the present invention has been described and illustrated herein as embodied in specific constructions of a voice message recording unit for use in conjunction with a variety of telephone apparatus, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A telephone recording apparatus, comprising:
   a) a telephone handset having a handgrip portion to be held by a user, said handgrip portion having opposite sides at the exterior of the handset; and
   b) message means for recording a voice message uttered by the user in a recording mode, and for playing an audible recorded message in a playback mode, said message means including
      a housing supported by the handset and having opposite lateral edge regions at said opposite sides of the handset,
      an electrical recorder device supported by the housing,
      an electric power source electrically connected to the recorder device for supplying electrical power thereto,
      a microphone electrically connected to the recorder device, and operative for converting the voice message into electrical input signals and for supplying said electrical input signals to the recorder device,
      a speaker electrically connected to the recorder device, and operative for converting electrical output signals from the recorder device into the recorded message to be played, and
      manually actuatable recording and playback controls for controlling the recorder device in the recording and playback modes respectively, said controls being located at at least one of said opposite lateral edge regions of the housing and being accessible to the user at at least one of said opposite sides of the handset.

2. The recording apparatus as defined in claim 1, wherein the telephone handset has a first shell part hinged to the handgrip portion, and wherein the housing is a second shell part mounted on the first shell part for hinged movement therewith.

3. The recording apparatus as defined in claim 2, wherein the second shell part is detachably mounted on the first shell part.

4. The recording apparatus as defined in claim 2, wherein the first shell part is hinged to the handset at one end region, and has an opposite free end region spaced along a longitudinal direction away from said one end region; and wherein each lateral edge region of the second shell part extends along the longitudinal direction.

5. The recording apparatus as defined in claim 1, wherein the recorder device includes a solid-state integrated circuit chip.

6. The recording apparatus as defined in claim 1, wherein the power source includes a battery.

7. The recording apparatus as defined in claim 1, wherein the controls are located on both said opposite lateral edge regions of the housing.

8. The recording apparatus as defined in claim 1, wherein the electrical power source, the microphone and the speaker are all supported by the housing.

9. The recording apparatus as defined in claim 1, wherein the message means includes a radio frequency transmitter electrically connected with the recorder device, said transmitter being operative for broadcasting radio frequency signals corresponding to said electrical output signals for reception at and conversion thereof into the recorded message by a nearby multipurpose radio receiver.

10. The recording apparatus as defined in claim 9, wherein the transmitter is operative for transmitting the radio frequency signals at an FM transmission frequency at which the radio receiver is tuned.

11. The recording apparatus as defined in claim 9, wherein the transmitter is supported by the housing.

12. The recording apparatus as defined in claim 1, wherein the speaker is a dedicated loudspeaker supported by the housing, and wherein the message means includes a radio frequency transmitter operative for broadcasting radio frequency signals corresponding to said electrical output signals for reception at and conversion thereof into the recorded message by a nearby multipurpose radio receiver; and further comprising means for electrically connecting the loudspeaker or the transmitter with the recorder device, including a selector switch movable between two positions in which it connects the recorder device exclusively with the loudspeaker or the transmitter.

\* \* \* \* \*